US006525287B2

(12) United States Patent
Lin

(10) Patent No.: US 6,525,287 B2
(45) Date of Patent: Feb. 25, 2003

(54) POWER SUPPLY FOR ELECTRO-EROSION MACHINE

(75) Inventor: Tong-Han Lin, Tainan Hsien (TW)

(73) Assignee: Tai-I Electron Machining Co. Ltd., Tainan Hsien (TW)

( * ) Notice: Subject to any disclaimer, the term of this patent is extended or adjusted under 35 U.S.C. 154(b) by 95 days.

(21) Appl. No.: 09/842,725

(22) Filed: Apr. 27, 2001

(65) Prior Publication Data

US 2002/0162823 A1 Nov. 7, 2002

(51) Int. Cl.[7] ................................................. B23H 1/02
(52) U.S. Cl. ..................................................... 219/69.13
(58) Field of Search ............................ 219/69.13, 69.18

(56) References Cited

U.S. PATENT DOCUMENTS 4,347,424 A * 8/1982 Obara ..................... 219/69.13
4,894,504 A * 1/1990 Truty ...................... 219/69.13
6,211,481 B1 * 4/2001 Toyonaga et al. ........ 219/69.13

* cited by examiner

Primary Examiner—Geoffrey S. Evans
(74) Attorney, Agent, or Firm—Rosenberg, Klein & Lee

(57) ABSTRACT

A power supply for electro-erosion machine includes a capacitive network in series connected in the current loop for limiting or controlling the current flow through the gap formed by electrode and work-piece a switching device is adapted to change the direction of charging and discharging current of the capacitive network, a driving circuit (firing circuit) is adapted to drive the switching device on and off so as to control current flow through the capacitive network. This lower resistance circuit eliminates huge power loss and reduces switching stress of the switching device. The electro-erosion ON-OFF time signal and the current-pattern control along with the circuit, constitutes a compact, low electrode wear and low electromagnetic noise electro-erosion machine power supply.

30 Claims, 11 Drawing Sheets

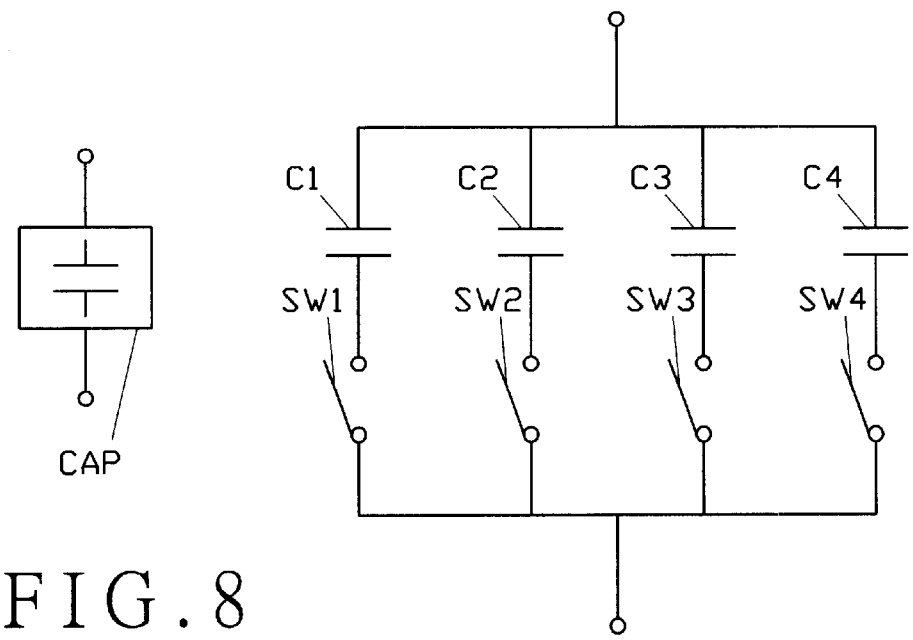
FIG. 8
FIG. 10
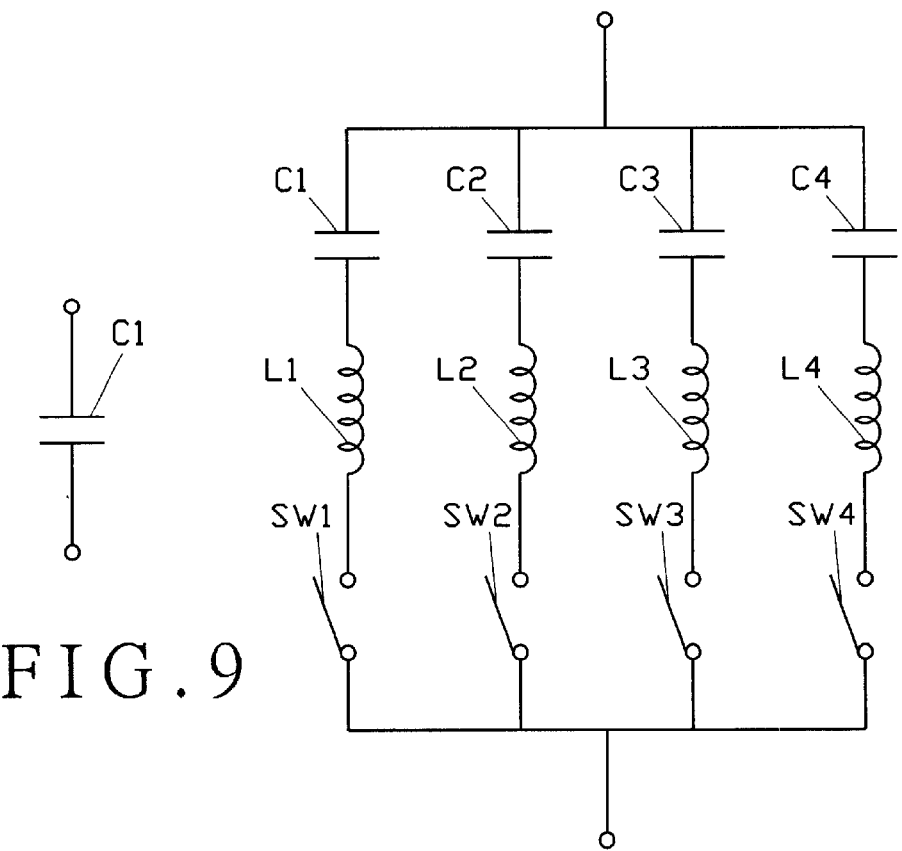
FIG. 9
FIG. 11

POWER SUPPLY FOR ELECTRO-EROSION MACHINE

BACKGROUND OF THE INVENTION

1. Field of the Invention

This invention relates to a power supply for electro-erosion machine, in particular to an electro-erosion power supply comprising a low resistance circuitry, used in die sinker Electrical Discharge Machine (EDM), hole drilling EDM, wire EDM or other equipment using electro-erosion process to cut the work-piece.

2. Description of the Related Prior Art

The EDM has an electrical discharge power supply connected to the gap formed by the electrode and the work-piece, for providing a machining current through the gap to cut the work-piece. In order to avoid arcing and to get the desire surface roughness on the work-piece, the amplitude of the gap current need to be controlled or limited during a single pulse (ON TIME), and an ON-OFF time signal is also used to start/stop the gap current during cutting the work-piece.

FIG. 14 has shown a prior art, which is an early prior art to control and limit the gap current, that utilizes a resistor connected in series to the gap to limit the current, however, the current flow through the gap also through the resistor, thus causes huge power loose. Further, although the resistors limit the current to a certain valve, the gap current may still change while the gap condition has been changed.

Later, a U.S. Patent was issued with U.S. Pat. No. 5,534,675, as shown in FIG. 15, which did not use serial resistors to limit the gap current, in stead, it uses a switching element being connected in series in the current loop and a current feedback resistor to detect the current flow through the gap, By switching the switching device on and off it limit the gap current. Because of no passive component to limit the current, it may cause serious damage when the switching device, the driving circuit of switching elements or the current detection circuit malfunction, the current will be out of control and causes circuit damages. Further, due to the high frequency operation and high current switching stress of switching element, the switching element must have big heat sink; and may also causes big electromagnetic noise. Although the prior art shown in FIG. 15 is compact with respect to the FIG. 14, however, the prior art in FIG. 15 still has safety concern for its lacking of passive component connected in series in the current loop to limit the gap current.

SUMMARY OF THE INVENTION

It is the primary object of the present invention to provide a low resistance power supply for electro-erosion machine, which comprises a capacitive network in series connected in the current loop to limit the current at the gap formed by the electrode and work-piece, a switching device is adapted to change the direction of charging or discharging current of said capacitive network to continually pass the current, and a driving circuit to turn the switching device ON and OFF repeatedly during ON time, so as to control the gap current. Owing to the character of the capacitive network, this design is a safe low resistant power supply circuitry, which eliminates a high power loose and reduces the switching stress on the switching device.

The electro-erosion ON-OFF time signal and current pattern control is connected to this circuitry forming a compact, low power loose and low electromagnetic noise electro-erosion power supply.

BRIEF DESCRIPTION OF THE DRAWINGS

FIG. 8 is the symbol of said capacitive network in the present invention.

FIG. 9 is one embodiment of said capacitive network of the present invention;

FIG. 10 is one embodiment of said capacitive network of the present invention;

FIG. 11 is one embodiment of said capacitive network of the present invention;

DETAILED DESCRIPTION OF THE PREFERRED EMBODIMENTS

Figure 1:
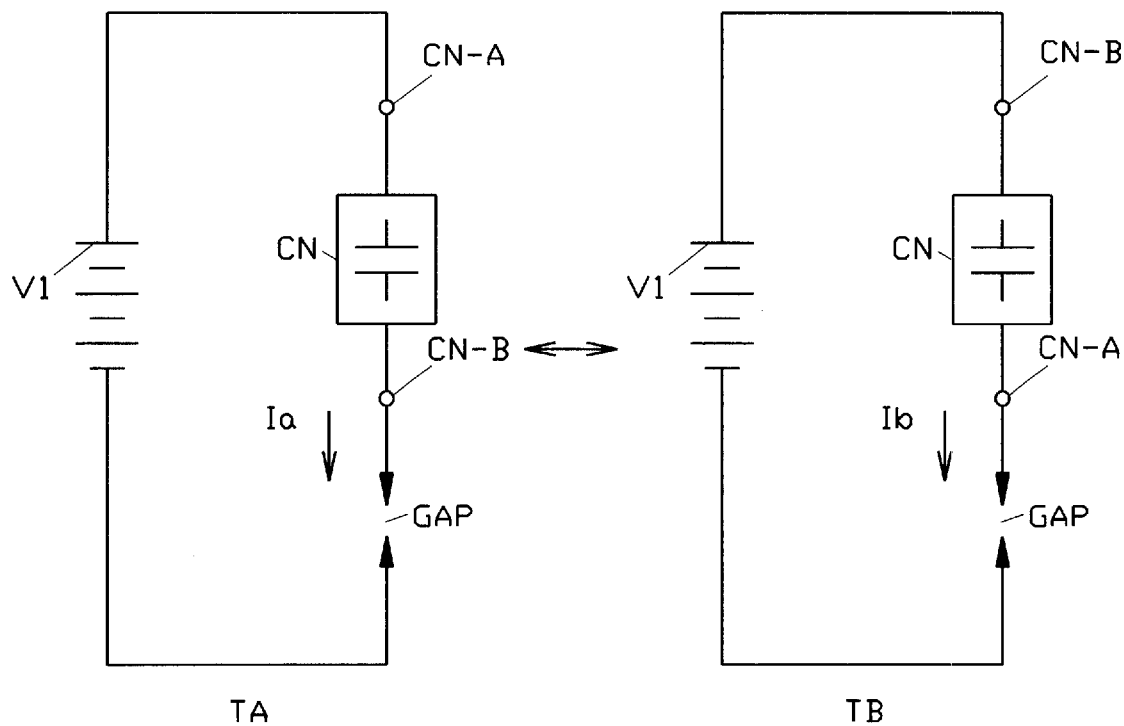
FIG. 1 is a diagram showing how the present invention works.
Figure 1:
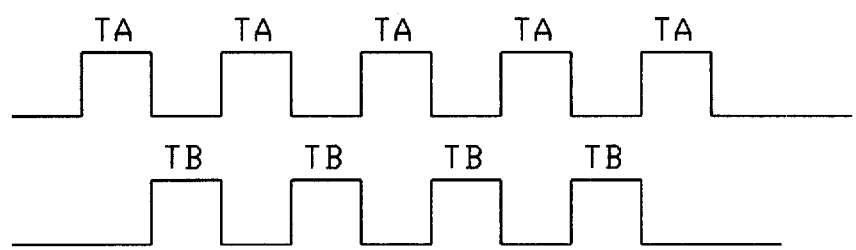

FIG. 1 is a diagram showing how the present invention works. Wherein the top left part is the equivalent circuit during time period of TA while the top right part is the equivalent circuit during time period of TB. The V1 is power source, GAP is formed by work-piece and electrode, and CN is a capacitive network having two nodes CN-A and CN-B, when in the of TA, CN-A and CN-B are connected in series between V1 and GAP which allows current $I_a$ to flow the GAP through, whereas, When in the time TB, CN-A and CN-B are connected in series also however in reversed direction and current $I_b$ will pass through the GAP.

Figure 2:
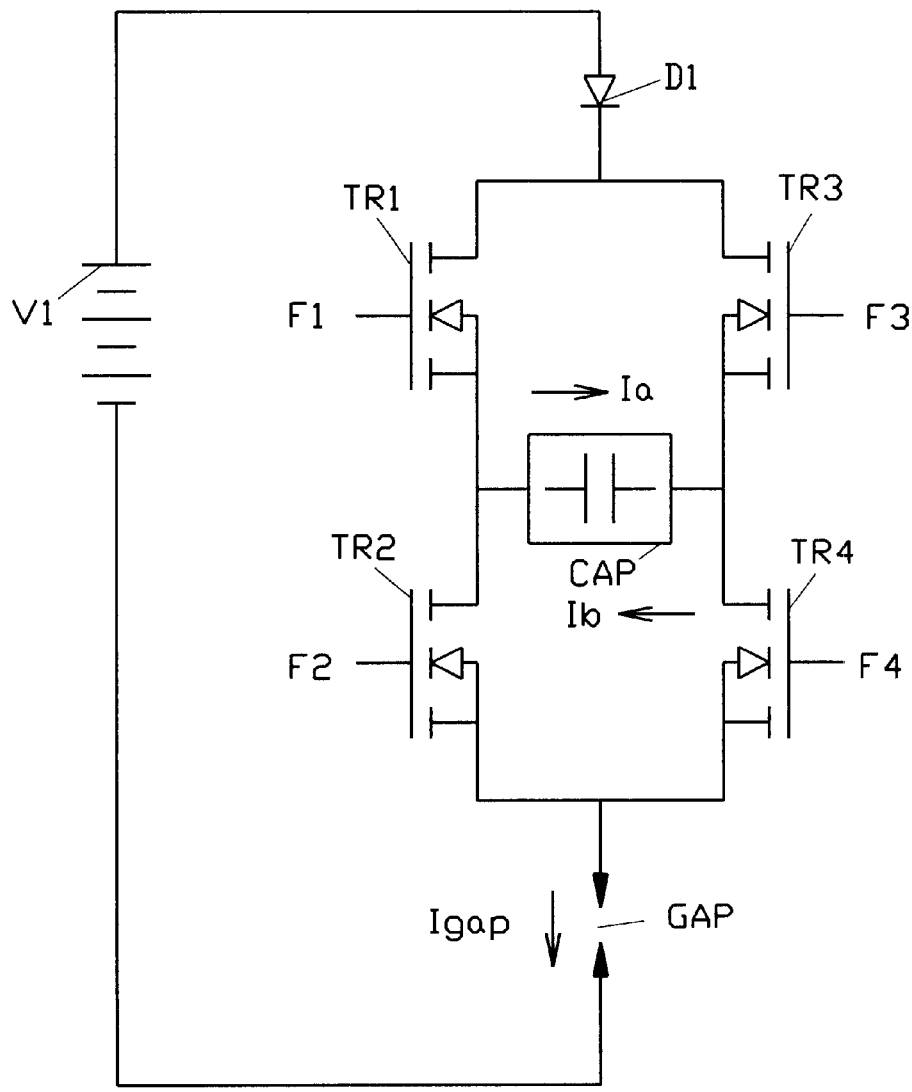
FIG. 2 is one embodiment of the present invention.
Figure 2:
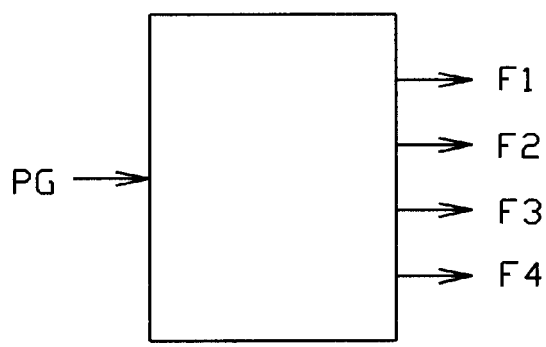
Figure 3:
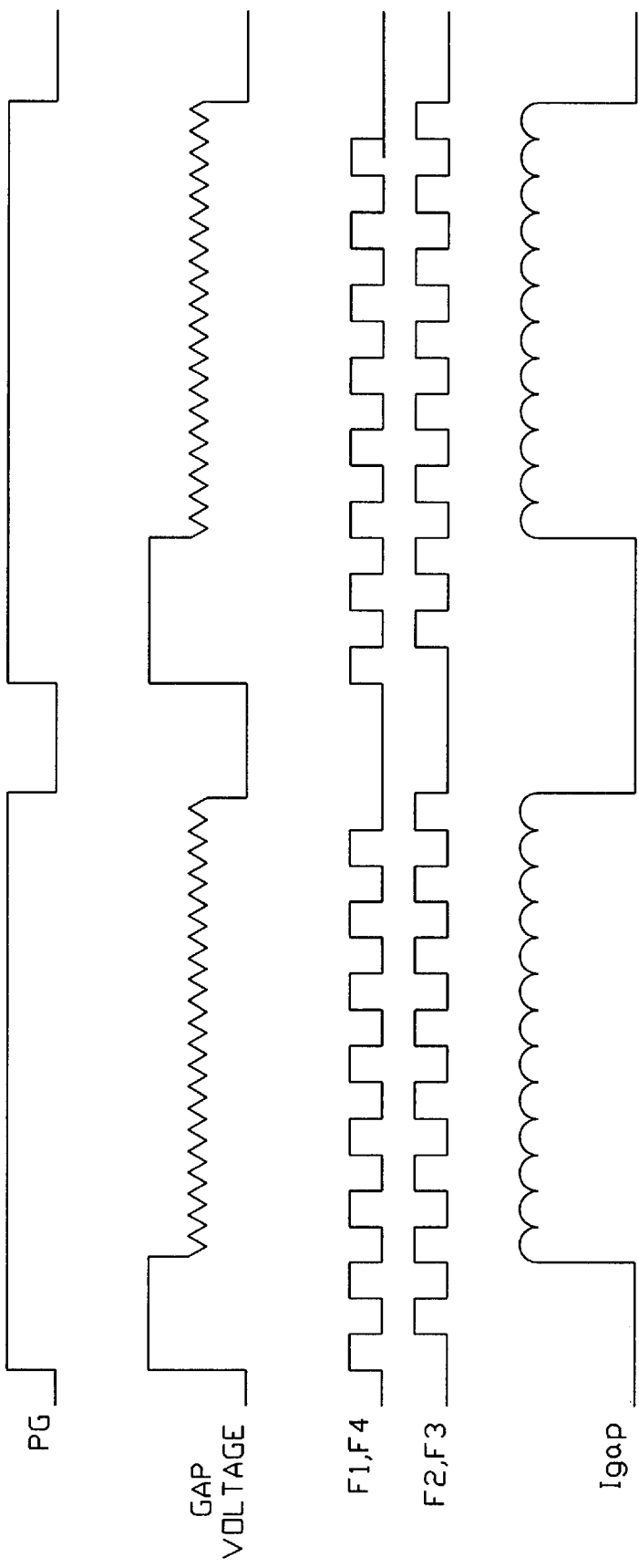
FIG. 3 shows the waveform of signals in FIG. 2.

FIG. 2 is one embodiment of the present invention. It shows a power source V1, a diode D1, and number of switches TR1, TR2, T3 AND TR4. CAP is a capacitive network, PG is an EDM ON-OFF TIME signal, when PG=1, GAP current is active, when PG=0, GAP current inactive. F1, F2, F3, F4 are driving signal for TR1, TR2, TR3 AND TR4, when the value is 1, the switch is on, when value is 0, the switch is off FIG. 3 describes their signal waveforms, when PG=0, F1, F2, F3 and F4=0, TR1, TR2, TR3 and TR4 will be off, Igap=0; when PG=1 and in the time period of TA F1 and F4=1, F2 and F3=0, the TR1 and TR4 are on and TR2 and TR3 are off, whereas current $I_a$ flows through V1, D1, TR1, CAP, TR4, GAP and charge CAP. Being GAP is connected in series in this current loop, the current will decay. When PG=1 in the time period of TB, F1 and F4=0, F2 and F3=1 which causes TR1 and TR4 to off, and TR2 and TR3 are on, current flows through V1, D1, TR3, CAP, TR2, GAP and charge CAP by a reverse direction current, whereas the current will also decay. Repeating the operations of changing TA and TB causes current $I_a$ and $I_b$ flow through CAP and produces current Igap.

Figure 4:
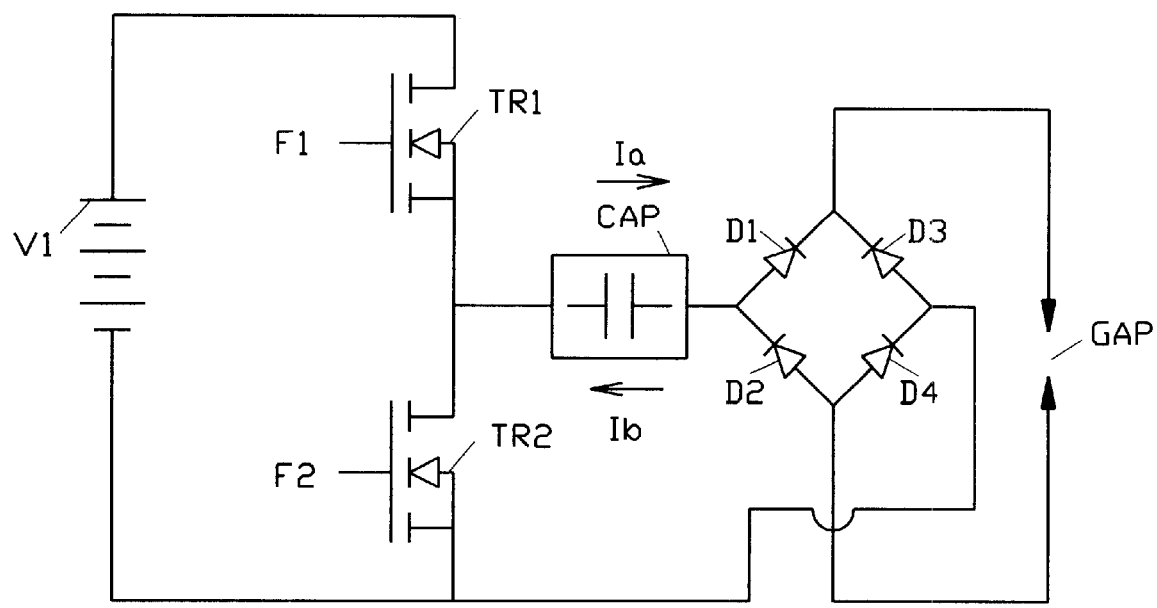
FIG. 4 is one embodiment of the present invention.
Figure 4:
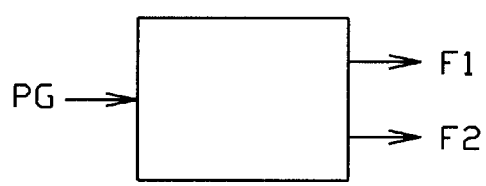
Figure 5:
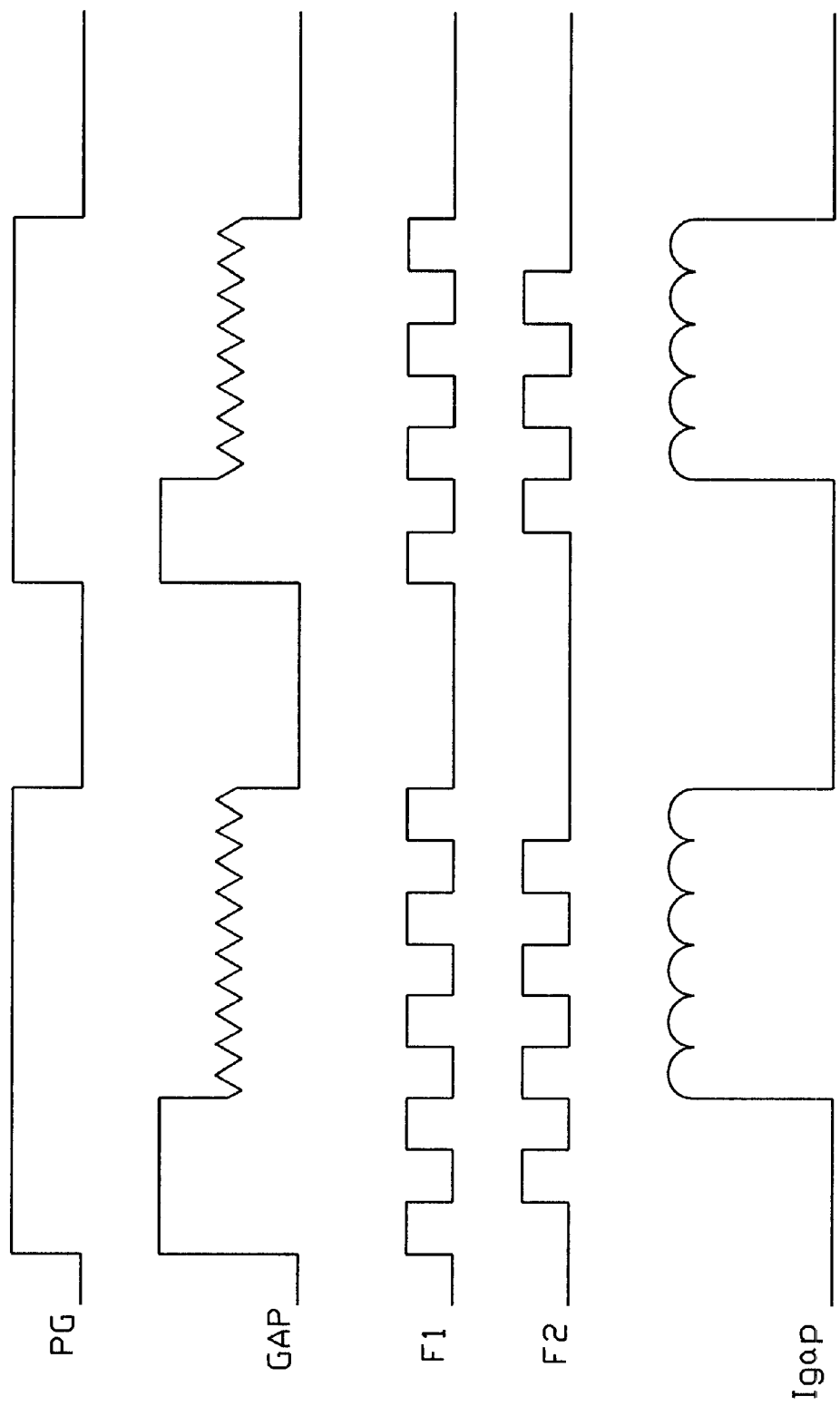
FIG. 5 shows the waveform of signals in FIG. 4.

FIG. 4 is another embodiment of the present invention. It shows a power source V1, four diodes D1, D2, D3, D4, two switches TR1 and TR2, a capacitive network CAP and a GAP formed by work-piece and the electrode, wherein the PG is EDM ON-OFF TIME signal, signal F1 and F2 represents driving signal for TR1 and MR2, thus, when the driving signal is on, the related switch is on, whereas when driving signal is off, the related switch is off. Signal waveforms are shown as in FIG. 5. When PG=0, F1 , F2=0, the switch TR1 and TR2 are off, and Igap=0. When PG=1 of time period TA, TR1=1 and TR2=0, current $I_a$ flows through TR1, CAP, D1, GAP and D4 to charge CAP, the current decrease with time elapsed, however, when PG=1 in the TB period of time, F1=0, F2=1, TR1 is off and TR2 is on at this moment the charge stored in CAP coming from the TR2, D3, GAP and D2 produces $I_b$ in different direction, which also decrease with time elapsed, the repeating operation of changing TA and TB produces the current Igap.

Figure 6:
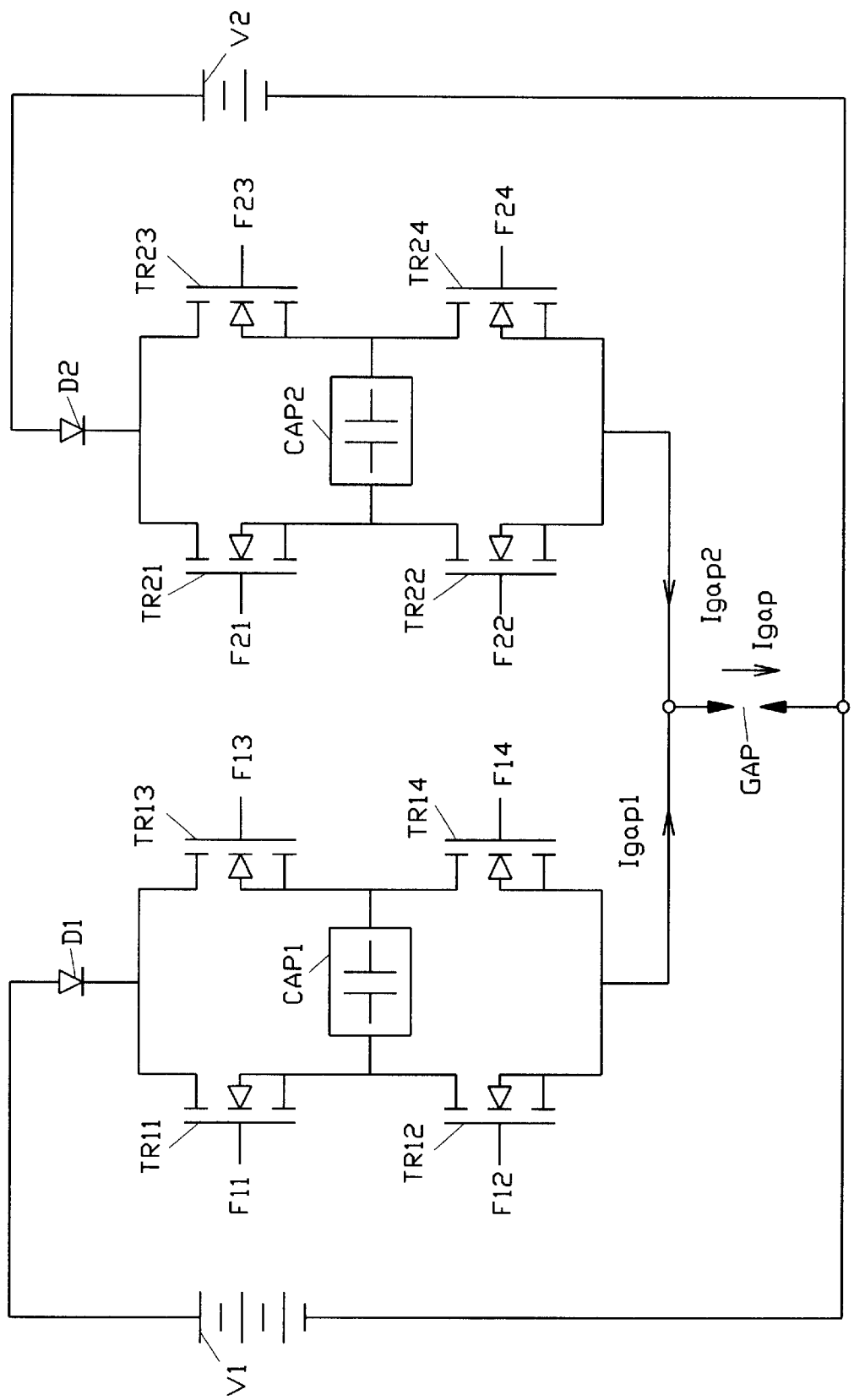
FIG. 6 is one embodiment of the present invention.

FIG. 6 is another embodiment of the present invention. It comprises two power sources V1, V2, two diodes D1, D2, two sets of switches TR11, TR12, TR13, TR14, and TR21, TR22, TR23, TR24, two sets of capacitive networks CAP1 and CAP2. The outputs of these two sets circuit are connected to the gap formed by electrode and work-piece. The driving signals F11, F12, F13, F14 are similar to the description of FIGS. 2 and 3. When PG=1, repeating operation of changing TA and TB produces Igap1. The other set of driving signals F21, F22, F23, F24 are also similar to the description of FIGS. 2 and 3. When PG=1, repeating operation of changing TA and TB produces Igap2, thus the GAP has a current of Igap1+Igap2.

Figure 7:
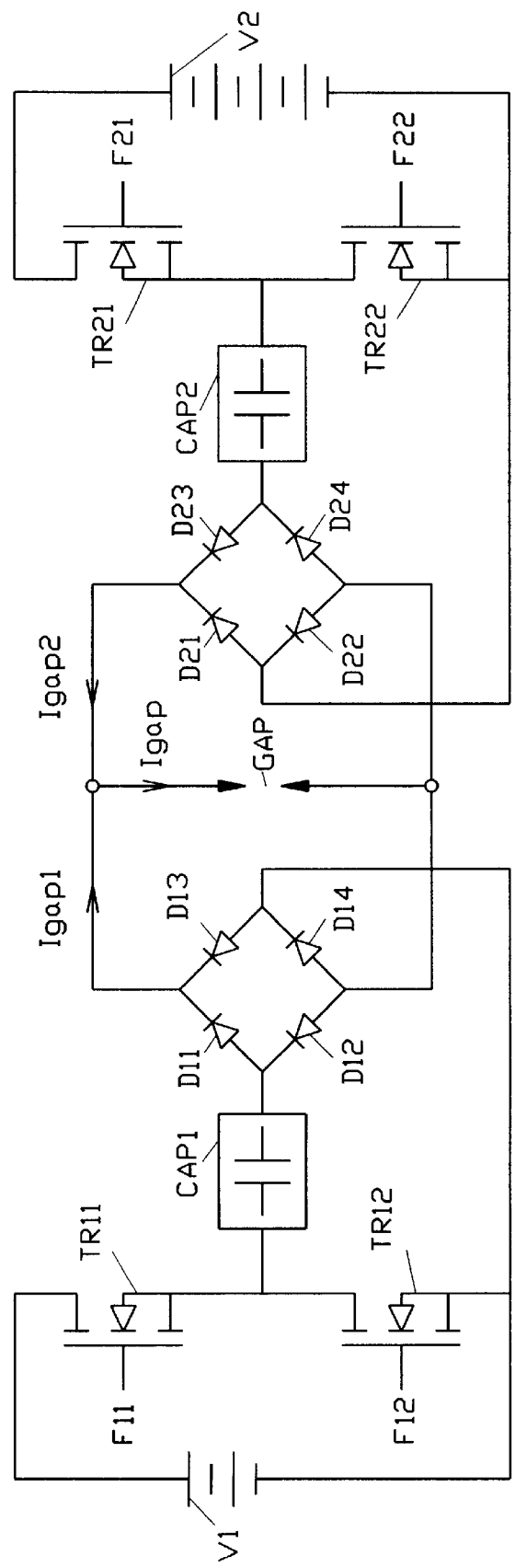
FIG. 7 is one embodiment of the present invention.

FIG. 7 utilizes two power supplies V1, V2, two sets of switches TR11, TR21 and TR21, TR22, two sets of capacitive networks CAP1 and CAP2, two sets of diodes D11, D12, D13, D14 and D21, D22, D23, D24, with their outputs connected to the GAP formed by electrode and work-piece. The driving signals F11, F12 are similar to the description of FIGS. 4 and 5. When PG=1, repeating operation of changing TA and TB produces Igap1, the other set of driving signals F21, F22 are also similar to the description of FIGS. 4 and 5. When PG=1, repeating operation of changing TA and TB produces Igap2, thus the GAP has a current of Igap1+Igap2.

Figures 12, 13:
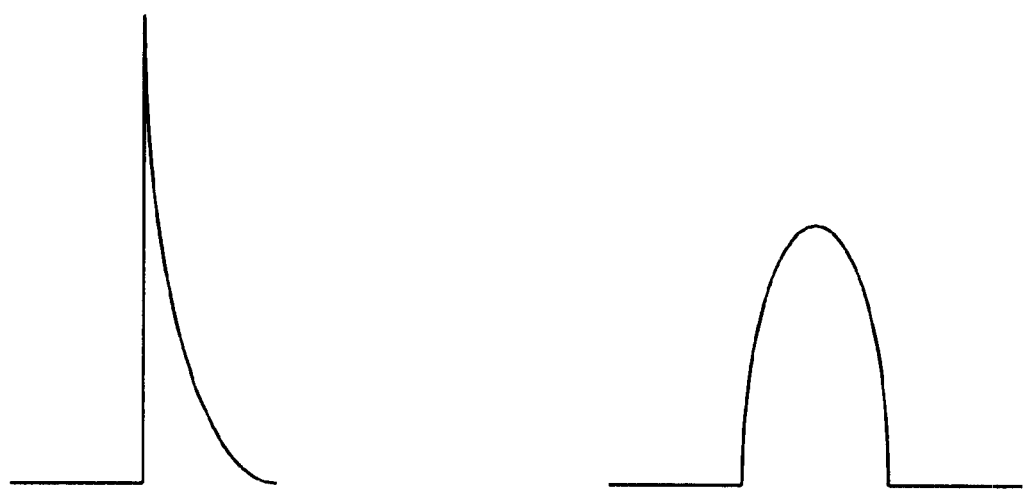
FIG. 12 depicts the current waveform of FIGS. 9 and 10.
FIG. 13 depicts the current waveform of FIG. 11.
Figure 14:
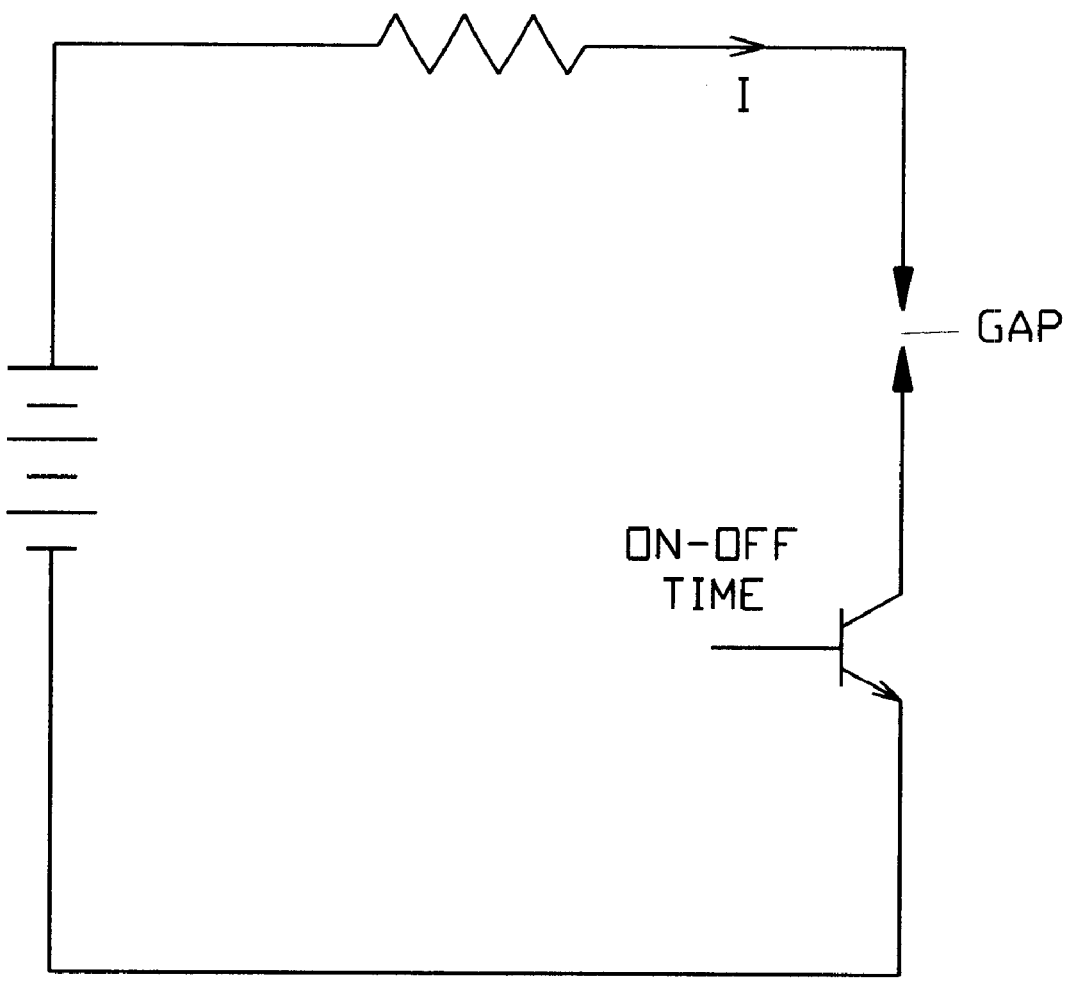
FIG. 14 is a circuit of prior art.
Figure 15:
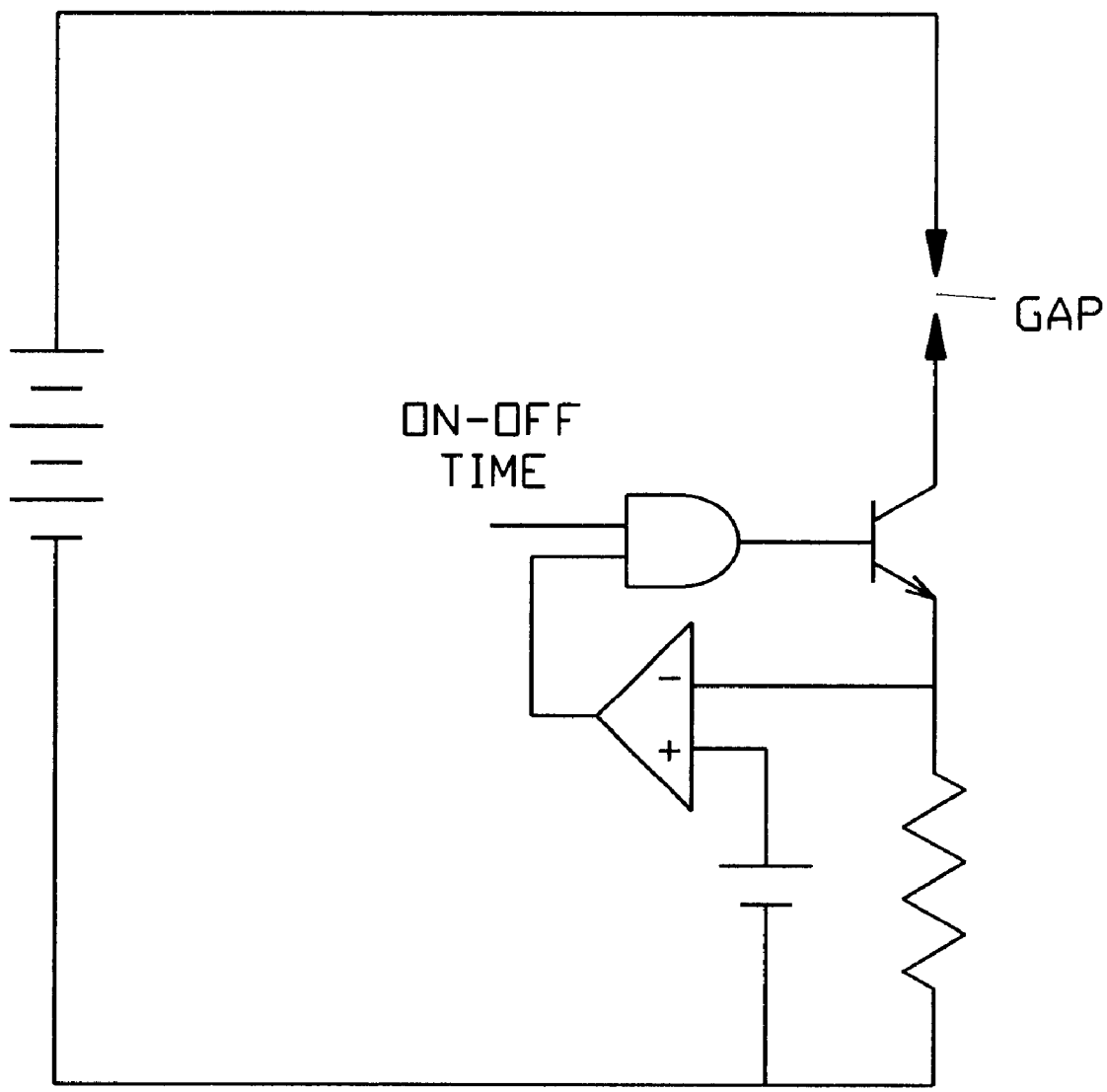
FIG. 15 is another circuit of a prior art.

FIGS. 8 through 11 depict the capacitive network, wherein FIG. 8 is a symbol of said capacitive network, FIG. 9 is one embodiment, a capacitor C1, FIG. 10 is another embodiment of capacitive network, which comprises four capacitors C1, C2, C3, C4, and four relays SW1, SW2, SW3, SW4, by switching these switches on and off, the value of capacitor may be changed, the larger capacitance produces a higher current. FIG. 11 is another embodiment, a more sophisticated network, which further comprises all the elements as shown in FIG. 10 with an inductor to soften charging spike, likewise, with the switches SW1~SW4 turned on and off, the charging value of the capacitor may varied. FIG. 12 shows the charging current pattern of FIGS. 9 and 10; FIG. 13 shows the charging current pattern of FIG. 11.

I claim:

1. A power supply for electro-erosion machine comprising a power source, a gap formed by electrode and work-piece, means for controlling current through said gap, and said means comprising:

a device being connected in between said power source and said gap to control the gap current, said device comprising a capacitive network, switches and driving circuit to fire said switches, wherein said capacitive network is in series connected in the current loop for controlling or limiting the current flowing through said switches or said gap;

said switches being connected with said capacitive network and repeatedly operated to charging and discharging said capacitive network by multi-direction current.

2. A power supply for electro-erosion machine as recited in claim 1, wherein said switches are electronic switches.

3. A power supply machine as recited in claim 1, wherein said driving circuit detects the signal from said capacitive network for controlling said gap current.

4. A power supply for electro-erosion machine as recited in claim 1, wherein said driving circuit comprises an ON-OFF time input signal, wherein during ON-time status, current flows through said gap.

5. A power supply for electro-erosion machine as recited in claim 1, wherein said driving circuit comprises an ON-OFF time input and a current command input to generate driving signal for said switches to control the gap current according to the said current command during ON-time.

6. A power supply for electro-erosion machine as recited in claim 1, wherein said capacitive network comprises a capacitor.

7. A power supply for electro-erosion machine as recited in claim 1, wherein a said capacitive network further comprises an inductor.

8. A power supply for electro-erosion machine as recited in claim 1, wherein said capacitive network uses an electronic switch or relay to switch the element on said capacitive network so as to change the impedance of said network.

9. A power supply for electro-erosion machine as recited in claim 1, comprising multiple sets of said capacitive network and switches.

10. A power supply for electro-erosion machine as recited in claim 1, comprising multiple sets of power source and multiple sets of said capacitive network and switches.

11. An electrical discharge machine comprising a power source, a gap formed by electrode and work-piece, means for controlling current through said gap, and said means comprising:

a device being connected in between said power source and said gap to control the gap current, said device comprising a capacitive network, switches and driving circuit to fire said switches, wherein said capacitive network is in series connected in the current loop for controlling or limiting the current flowing through said switches or said gap;

said switches being connected with said capacitive network and repeatedly operated to charge and discharge said capacitive network by multi-direction current.

12. An electrical discharge machine as recited in claim 11, wherein said switches are electronic switches.

13. An electrical discharge machine as recited in claim 11, wherein said driving circuit detects the signal from said capacitive network for controlling said gap current.

14. An electrical discharge machine as recited in claim 11, wherein said driving circuit comprises an ON-OFF time input signal, wherein during ON-time status, currently through said gap.

15. An electrical discharge machine as recited in claim 11, wherein said driving circuit comprises an ON-OFF time input and a current command input to generate driving signal for said switches to control the gap current according to the said current command during ON-time.

16. An electrical discharge machine as recited in claim 11, wherein said capacitive network comprises a capacitor.

17. An electrical discharge machine as recited in claim 11, wherein said capacitive network further comprises an inductor.

18. An electrical discharge machine as recited in claim 11, wherein said capacitive network uses an electronic switch or relay to switch the element on said capacitive network so as to change the impedance of said network.

19. An electrical discharge machine as recited in claim 11, comprising multiple sets of said capacitive network and switches.

20. An electrical discharge machine as recited in claim 11, comprising multiple sets of power source and multiple sets of said capacitive network and switches.

21. A method of controlling a power supply for electro-erosion machining having a power source, a gap formed by electrode and work-piece, and for controlling current through said gap, wherein said means comprising:

using a device being connected in between said power source and said gap to control the gap current, said device comprising a capacitive network, switches and driving circuit to fire said switches, wherein said capacitive network is in series connected in the current loop for controlling or limiting the current flowing through said switches or said gap; and said switches being connected with said capacitive network and repeatedly operated to charge and discharge said capacitive network by multi-direction current.

22. A method of controlling a power supply for electro-erosion machining as recited in claim 21, wherein said switches are electronic switches.

23. A method of controlling a power supply for electro-erosion machining as recited in claim 21, wherein said driving circuit detects the signal from said capacitive network for controlling said gap current.

24. A method of controlling a power supply for electro-erosion machining as recited in claim 21, wherein said driving circuit comprises an ON-OFF time input signal wherein during ON-time status, current flows through said gap.

25. A method of controlling a power supply for electro-erosion machining as recited in claim 21, wherein said driving circuit comprises an ON-OFF time input and a current command input to generate driving signal for said switches to control the gap current according to the said current command during ON-time.

26. A method of controlling a power supply for electro-erosion machining as recited in claim 21, wherein said capacitive network comprises an capacitor.

27. A method of controlling a power supply for electro-erosion machining as recited in claim 21, wherein said capacitive network comprises an inductor.

28. A method of controlling a power supply for electro-erosion machining as recited in claim 21, wherein said capacitive network uses an electronic switch or relay to switch the element on said capacitive network so as to change the impedance of said network.

29. A method of controlling a power supply for electro-erosion machining as recited in claim 21, wherein using multiple sets of said capacitive networks and switches.

30. A method of controlling a power supply for electro-erosion machining as recited in claim 21, wherein using multiple sets of power source and multiple sets of said capacitive network and switches.

* * * * *